US012780733B2

(12) United States Patent
Fan et al.

(10) Patent No.: US 12,780,733 B2
(45) Date of Patent: Nov. 3, 2026

(54) DRY MIXES AND CEMENTS COMPRISING CELLULOSE ETHERS HAVING POLYETHER GROUPS AS LUBRICATIVE ADDITIVES FOR ROLLER COMPACTED CONCRETE APPLICATIONS AND METHODS OF USING THEM

(71) Applicants: Dow Global Technologies LLC, Midland, MI (US); Rohm and Haas Company, Collegeville, PA (US)

(72) Inventors: Yi Fan, Lake Jackson, TX (US); Michael J. Radler, Saginaw, MI (US); Jorg Theuerkauf, Midland, MI (US); Jessica R. Levin, Collegeville, PA (US); Robert L. Sammler, Midland, MI (US)

(73) Assignees: DOW GLOBAL TECHNOLOGIES LLC, Midland, MI (US); ROHM AND HAAS COMPANY, Midland, MI (US)

( * ) Notice: Subject to any disclaimer, the term of this patent is extended or adjusted under 35 U.S.C. 154(b) by 335 days.

(21) Appl. No.: 18/568,999

(22) PCT Filed: Jul. 27, 2022

(86) PCT No.: PCT/US2022/038453
§ 371 (c)(1),
(2) Date: Dec. 11, 2023

(87) PCT Pub. No.: WO2023/014548
PCT Pub. Date: Feb. 9, 2023

(65) Prior Publication Data

US 2024/0279118 A1 Aug. 22, 2024

Related U.S. Application Data

(60) Provisional application No. 63/228,657, filed on Aug. 3, 2021.

(51) Int. Cl.

| | |
|---|---|
| ***C04B 24/38*** | (2006.01) |
| ***C04B 28/04*** | (2006.01) |
| ***C04B 40/00*** | (2006.01) |
| *C04B 103/32* | (2006.01) |

(52) U.S. Cl.
CPC ............ *C04B 24/386* (2013.01); *C04B 28/04* (2013.01); *C04B 40/0042* (2013.01); *C04B 2103/32* (2013.01)

(58) Field of Classification Search
CPC ... C04B 24/386; C04B 28/04; C04B 40/0042; C04B 24/383; C04B 2111/0075; C04B 14/06; C04B 40/0608; C04B 40/065; C04B 2103/44; E01C 7/142
See application file for complete search history.

(56) References Cited

U.S. PATENT DOCUMENTS

| | | | | |
|---|---|---|---|---|
| 5,622,558 | A | 4/1997 | Berke et al. | |
| 8,377,196 | B2 | 2/2013 | Bury et al. | |
| 9,056,792 | B2 | 6/2015 | Weerawarna et al. | |
| 9,416,052 | B2 | 8/2016 | Feldman et al. | |
| 10,150,704 | B2 | 12/2018 | Hild et al. | |
| 10,435,332 | B2 * | 10/2019 | Yamakawa | C04B 18/02 |
| 2008/0156225 | A1 * | 7/2008 | Bury | C04B 40/0039 106/692 |
| 2022/0162124 | A1 | 5/2022 | Boon et al. | |

FOREIGN PATENT DOCUMENTS

| | | | |
|---|---|---|---|
| CN | 101182139 | 5/2008 | |
| CN | 108975758 | 12/2018 | |
| CN | 110143791 | 8/2019 | |
| CN | 111302718 | 6/2020 | |
| EP | 1266877 | 12/2002 | |
| KR | 20170011776 | 2/2017 | |
| WO | 2003048070 | 6/2003 | |
| WO | 2005105702 | 11/2005 | |
| WO | 2012051034 | 4/2012 | |
| WO | 2013074296 | 5/2013 | |
| WO | WO-2013074296 A1 * | 5/2013 | E01C 3/04 |
| WO | 2014062401 | 4/2014 | |
| WO | 2020176211 | 9/2020 | |
| WO | 2020223040 | 11/2020 | |
| WO | 2022177807 | 8/2022 | |

OTHER PUBLICATIONS

Bartelmus, "Die Analytik von Celluloseathergruppen", Fresenius Zeitschrift fuer Analytische Chemie, 1977, vol. 286, pp. 161-190.
(Continued)

*Primary Examiner* — Amber R Orlando
*Assistant Examiner* — Anastasia A. Kuvayskaya

(57) ABSTRACT

The present invention provides a dry mix composition of a powder of an ultra high-viscosity cellulose ether having one or more polyether groups, the cellulose ether having a 1 wt. % aqueous solution viscosity (20 C, 2.55 $s^{-1}$ shear rate as determined using a controlled rate rotational rheometer) ranging from 10,000 to 100,000 mPa·s, or, preferably, 11,000 to 16,000 mPa·s, a graded aggregate, and a hydraulic cement, or a wet granular mix of the cement, graded aggregate and an admixture therefor including the cellulose ether. When combined with water to form a wet granular hydraulic cement composition, the composition of the present invention behaves like asphalt compositions and has zero or near zero slump, a high lubricity and 13.6 wt. % or less of water, or, preferably, from 5 to 11 wt. % of water, based on the total weight of the dry mix composition. The cellulose ether enables lubricity without impairing compaction and without causing air entrainment.

10 Claims, No Drawings

(56) References Cited

OTHER PUBLICATIONS

PCT/US2022/038453, International Search Report and Written Opinion with a mailing date of Dec. 9, 2022.

* cited by examiner

DRY MIXES AND CEMENTS COMPRISING CELLULOSE ETHERS HAVING POLYETHER GROUPS AS LUBRICATIVE ADDITIVES FOR ROLLER COMPACTED CONCRETE APPLICATIONS AND METHODS OF USING THEM

The present invention relates to a dry mix composition for use in roller compacted concrete (RCC) and low or zero slump wet cement compositions made therefrom, as well as methods of using the wet cement compositions comprising paving the wet cement compositions. More particularly, it relates to dry mix compositions comprising (a) hydraulic cement, (b) a graded aggregate, such as sand, finely divided granular materials, such as limestone, and (c) a powder of from 0.01 to 1.0 wt. %, or, preferably, from 0.05 to 0.3 wt. %, based on the total weight of the dry mix composition, of one or more cellulose ethers having polyether groups as sidechains, crosslinks, or as sidechains and crosslinks, preferably, polyoxyethylene groups; and it relates to granular wet cement compositions made from the dry mix compositions and up to 13.6 wt. %, or, up to 11 wt. % of water, based on the total weight of the dry mix compositions, which exhibit a slump as determined in accordance with ASTM C143 (2010), using a stainless steel cone height 80 mm, top diameter 40 mm, bottom diameter 90 mm, and a 9.5 mm diameter by 266.7 mm length steel rod stirrer, of less than 6 mm, or, preferably, less than 4.5 mm.

Roller Compacted Concrete (RCC) is a durable low-cost paving technology that has been used for secondary roads. Unlike traditional concrete pavement, RCC can be paved with asphalt paving equipment without the use of forms, molds, or reinforcements. Return to service for RCC roads can be as fast as 1 day after paving, whereas traditional concrete pavements can require weeks of curing before opening roads to traffic. The easier paving process and fast return to service makes RCC a desirable option so long as it can retain a smooth appearance and the characteristic high durability of concrete pavement. However, RCC has a higher volume of aggregate as compared to conventional concrete; and the exposed surface of known RCC pavement has a high area fraction of aggregate exposed and may be rough and subject to rapid deterioration because of insufficient compaction and loss of strength after paving, limiting RCC's use to parking lots, industrial roads, base layers, and shoulders.

In known versions of RCC, the compaction and workability issues have been managed by addition of chemical admixtures, as well as formulation optimization. The term "compaction" is defined as the act or result of densifying a material through the removal of air voids while moisture content is maintained. However, in paving a material an alternative path of "consolidation" can occur upon applying the pressure meant to compact the pavement, wherein the material is densified both through the removal of air voids and water. The removal of water has detrimental effects on the paving material and can ultimately cause failures and loss of strength. Creating a gradient of water composition when compacting from only the top surface can also be detrimental as the reduced water level at the top adversely impacts cement cure, while the excess water at the bottom can lead to a layer cured in the swollen state. However, admixtures were designed to reside in the fluid or paste phase of cement which is itself limited in RCC compositions. To see an impact on the desired compaction and workability, an extremely high level of admixture is required, making them cost-prohibitive and/or negatively impacting strength or workability. It would be desirable to create an RCC forming dry mix that enables good compaction without a high proportion of admixture ingredients.

U.S. Pat. No. 8,377,196 B2 to Bury et al., discloses a dry cast cementitious composition of a rheology modifying additive comprising of at least one shear thinning additive A, such as cellulose ethers, including hydroxyalkyl cellulose, salts of carboxyalkyl cellulose, carboxyalkyl hydroxyalkyl cellulose, hydroxyalkyl cellulose, and mixtures thereof), and one non-shear thinning additive B. The compositions can enable improved cycle time, ease of finishing, compressive strength and compaction ratio. However, the compositions of Bury et al. require a mold and fail to develop adequate viscosity to enable the provision of a composition which exhibits little or no slump when mixed, ruling out use in any compacted concrete paving solution.

In accordance with the present invention, the present inventors have solved the problem of providing a dry mix that provides a wet cement composition exhibiting good compaction and little or no slump and which is suitable for use in, for example, roller compaction or paving methods.

STATEMENT OF THE INVENTION

In accordance with the present invention, dry mix compositions comprise:

(a) hydraulic cement, for example, ordinary Portland cement, aluminate cement, fly ash, pozzolans, and their mixtures, in the amount of from 10 to 23 wt. % or, preferably, from 12 to less than 20 wt. %, based on the total weight of the dry mix composition, (b) graded aggregate in the amount of from 76 to 89.99 wt. % or, preferably, in the amount of from 79.70 to 87.95 wt. %, based on the total weight of the dry mix composition comprising i) one or more coarse aggregates having a sieve particle size of from 300 μm to 20 mm or, preferably, from 1 to 18 mm, for example, sand, limestone, gravel, granite, or clay, or, preferably sand or gravel, or, preferably, a combination of A) a first coarse aggregate and B) a second coarse aggregate wherein the first coarse aggregate has a sieve particle size of from 300 μm to 3000 μm, and the second coarse aggregate has a sieve particle size of from 2000 μm to 20 mm, or, from 3000 μm to 20 mm, or up to 18 mm, wherein a ratio of the sieve particle size of the second coarse aggregate to that of the first coarse aggregate ranges from 15:1 to 1.5:1, or, preferably from 10:1 to 2:1, and ii) one or more fine aggregates, preferably limestone or sand, having a sieve particle size of from 40 to less than 300 μm or, preferably, from 70 to less than 300 μm, and, (c) a powder of one or more cellulose ethers having one or more polyether groups as sidechains, crosslinks, or as sidechains and crosslinks, such as poly(oxyalkylene) groups, preferably, poly(oxyethylene) groups, as the polyether sidechains, crosslinks, or as sidechains and crosslinks, in the amount of from 0.01 to 1.0 wt. % or, preferably, from 0.05 to 0.3 wt. %, based on the total weight of the dry mix composition, wherein the one or more cellulose ethers having one or more polyether groups has an aqueous solution viscosity at 1 wt. % cellulose ether solids, at 20° C., and a 2.55 $s^{-1}$ shear rate ranging from 10,000 to 100,000 mPa·s, or, preferably, 11,000 to 16,000 mPa·s, as determined using a controlled rate rotational rheometer (preferably, a Haake Rotovisko™ RV 100 rheometer, Thermo Fisher Scientific, Karlsruhe, DE), wherein the aqueous solution is made by drying the powder of the cellulose ether overnight in a 70° C. vacuum oven, dispersing it into hot water at 70° C., and allowing it to dissolve while cooling with stirring to room temperature and refrigerating it at 4° C. overnight, wherein, all wt. % s add to 100%.

In the (b) graded aggregate of the dry mix compositions, a weight ratio of the total i) coarse aggregate to the total ii) fine aggregate in the graded aggregate may range from 4:1 to 0.9:1, or, preferably, from 3:1 to 1:1; and, In the dry mix compositions, each polyether group of at least one of the cellulose ethers in the (c) powder of one or more cellulose ethers having one or more polyether groups may independently have from 4 to 50 or from 5 to 30, or, preferably, from 6 to 25 ether or oxyalkylene groups. In addition, the dry mix compositions of the present invention may comprise part of a granular wet cement composition, further comprising water.

The dry mix compositions in accordance with the present invention may further comprise (d) one or more superplasticizers, such as superplasticizers chosen from a polycarboxylate ether containing, naphthalene sulfonate containing, lignosulfonate containing superplasticizers, or mixtures thereof, preferably, a polycarboxylate ether containing superplasticizer.

In the dry mix compositions in accordance with the present invention, the (a) hydraulic cement may be chosen from an ordinary Portland cement, an aluminate cement, a pozzolan, or their mixtures, or, preferably, an ordinary Portland cement, an aluminate cement, or their mixture.

Preferably, in the (b) graded aggregate of the dry mix compositions in accordance with the present invention, the ratio of the sieve particle size of the total i) coarse aggregate to the sieve particle size of the ii) fine aggregate ranges from 10:1 to 2:1, or, preferably, from 8:1 to 2:1.

More preferably, the dry mix compositions in accordance with the present invention comprise as the coarse aggregate in the (b) graded aggregate a mixture of a i)A) first coarse aggregate, such as sand or gravel, having a sieve particle size of from 300 μm to 2000 μm and a i)B) second coarse aggregate having a sieve particle size of from 2000 μm to 20 mm, or up to 18 mm, such as gravel or stone, wherein a ratio of the sieve particle size of the i)B) second coarse aggregate to the sieve particle size of the i)A) first coarse aggregate ranges from 15:1 to 1.5:1, or, preferably from 10:1 to 2:1.

In the dry mix compositions in accordance with the present invention, at least one of the cellulose ethers in the (c) powder of one or more cellulose ethers having one or more polyether groups further has a side chain chosen from hydroxyethyl, hydroxypropyl, methyl, and combinations thereof, or, preferably, hydroxyethyl and methyl. More particularly, the at least one of the one or more cellulose ethers having polyether groups has a polyether degree of substitution of from 0.0005 to 0.01 eq, or, preferably, from 0.001 to 0.005 eq, as determined by the number of molar equivalents of polyether containing reactants per mole of anhydroglucose units (AGU) in the cellulose or cellulose ether used to make the cellulose ether having one or more polyether groups. Even more particularly, at least one of the (c) one or more cellulose ethers having one or more polyether groups is a hydroxyethyl methyl cellulose ether having a hydroxyethyl degree of substitution (MS) ranging from 0 and 0.4, and a methoxyl degree of substitution (DS) of from 1.2 to 1.8 or is a hydroxyethyl cellulose having a hydroxyethyl degree of substitution (MS) of from 1.4 to 2.4, or, preferably, from 1.8 to 2.2.

In the dry mix compositions in accordance with the present invention, the (d) one or more superplasticizers, when present, may be used in amounts of from 0.1 to 0.5 wt. % of polycarboxylate ethers, from 0.2 to 5.0 wt. % or from 0.3 to 1.0 wt. % of naphthalene sulfonate or lignosulfonate containing materials, preferably from 0.1 to 0.5 wt. % of polycarboxylate ethers, based on the total weight of the dry mix composition.

Preferably, the dry mix compositions in accordance with the present invention comprise less than 2 wt. % total of (c) one or more cellulose ethers having one or more polyether groups plus (d) one or more superplasticizers, based on the total weight of the dry mix composition.

The dry mix compositions in accordance with the present invention provide, when combined with water in the amount of from 5 to 13.6 wt. %, or, preferably, from greater than 5 to 11 wt. %, based on the total weight of the dry mix composition, a granular wet cement composition invention having a slump of less than 6 mm, or, preferably, less than 4.5 mm, as determined in accordance with ASTM C143 (2010), by mixing the dry mix in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into a stainless-steel cone (height 80 mm, top diameter 40 mm and bottom diameter 90 mm) which has been dampened with water via a sponge and placed on a non-absorbent surface, filling each of the three layers and mixing with a stainless-steel rod (preferably, of 266.7 mm length and 9.5 mm diameter) in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm.

Alternatively, the dry mix compositions in accordance with the present invention may comprise one-component of a two-component composition, wherein the first component comprises the dry mix composition, and the second component comprises water or a wet component, wherein either the first component or the second or wet component comprises the (c) one or more cellulose ethers having one or more polyether groups and, if used, any of the (d) one or more superplasticizers. The two-component composition comprises a granular wet mix composition which may have the appearance of wet dirt.

In a second aspect in accordance with the present invention, granular wet cement compositions from a dry mix composition and water comprise (a) hydraulic cement; the (b) graded aggregate; and, the c) one or more cellulose ethers having one or more polyether groups. The granular wet cement compositions in accordance with the present invention have a low water content, such as a water saturation level of 62% or less. Further, the granular wet cement compositions have a slump as determined in accordance with ASTM C143 (2010) of less than 6 mm, or, preferably, less than 4.5 mm. Still further, the granular wet cement compositions in accordance with the present invention have a lubricity of from 22° to 37° or less, or, preferably, from 26° to 36°, determined as the angle of the slope of a yield curve of the normal stress at which the compositions yield in shear testing plotted versus the normal stress in accordance with ASTM D6773-16 (2016). The granular wet cement compositions of the present invention may further comprise (d) one or more superplasticizers. In another aspect, the present invention provides methods of making and using the granular wet cement compositions, such as for use as a roller compacted concrete (RCC) composition, or such as by roller compacting the granular wet cement compositions.

DETAILED DESCRIPTION OF THE INVENTION

In accordance with the present invention, a granular hydraulic cement composition that behaves like asphalt compositions comprises a cellulose ether having one or more polyether groups as sidechains, crosslinks, or as sidechains and crosslinks in the cement admixture. The granular wet cement compositions in accordance with the present invention are slightly undersaturated in water and appear and behave like dirt as they do not pack or settle under their own weight. Likewise, the granular wet cement compositions formed by mixing the dry mix compositions in accordance with the present invention with water, or, optionally, aqueous admixtures including the cellulose ethers having one or more polyether groups, do not pack or settle under their own weight. The compositions of the present invention enable paving via "compaction" or volumetric compression without the loss of any wet cement materials to achieve the highest strength. The compositions provide viscosity to slow consolidation, or loss of water and cement, from the mass relative to compaction. In addition, the compositions enable enhanced lubricity in the formulation, which facilitates the aggregate particle movement needed to compact the pavement, densify, and remove the air voids to achieve optimal strength. In particular, the present inventors have found that in roller compacted concrete (RCC), a cellulose ether having one or more polyether groups as sidechains, crosslinks, or as sidechains and crosslinks, surprisingly improves compaction and thus concrete strength, even with up to 13.6 wt. % of water, based on the weight of dry mix compositions to which the water is added to make the RCC. In the granular wet cement compositions in accordance with the present invention, the viscosity of the interstitial aqueous phase measured at 20° C. and at 514 $s^{-1}$ ranges up to 50,000 mPa's to enable optimal strength and compaction at higher water loading. Further, in accordance with the present invention, the aqueous phase in the granular wet mix can be varied to a higher viscosity range to effectively reduce the amount of free water in an RCC mix. As a result, any over-lubrication effect can be avoided and a desirable yield strength of the RCC mix can be retained.

The singular forms "a," "an," and "the" include plural referents unless the context clearly dictates otherwise. Unless defined otherwise, the terms used herein have the same meaning as is commonly understood by one skilled in the art.

Unless otherwise indicated, any term containing parentheses refers, alternatively, to the whole term as if no parentheses were present and the same term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and are independently combinable. Thus, for example, a disclosed range of from 15:1 to 1.5:1, or, preferably from 10:1 to 2:1 means any or all ranges of from 15:1 to 1.5:1 or, from 15:1 to 10:1 or, from 15:1 to 2:1, or, preferably, from 10:1 to 2:1, or, from 10:1 to 1.5:1, or, from 2:1 to 1.5:1.

Unless otherwise indicated, conditions of temperature and pressure are room temperature (23° C.) and standard pressure (101.3 kPa, also referred to as "ambient conditions". And, unless otherwise indicated, all conditions include a relative humidity (RH) of 50%.

As used herein, the term "acrylic or vinyl" refers to addition polymerizable monomers or addition polymers of α, β-ethylenically unsaturated monomers, such as, for example, alkyl and hydroxyalkyl (meth)acrylates, vinyl ethers, ethylenically unsaturated carboxylic acids, alkyl (meth)acrylamides, or oxyalkylene chain group containing monomers, such as, for example, methoxy poly(ethylene glycol) (meth)acrylate (mPEG(M)A) or poly(ethylene glycol) (meth)acrylate (PEG(M)A) and allyl poly(ethylene glycol) (APEG).

As used herein the term "aqueous" means that the continuous phase or medium is water and from 0 to 10 wt. %, based on the weight of the medium, of water-miscible compound(s). Preferably, "aqueous" means water.

As used herein, the term "ASTM" refers to publications of ASTM International, West Conshohocken, PA.

As used herein, the term "hydraulic cement" includes substances which set and harden in the presence of water such as Portland cement, silicate-containing cements, aluminate-based or aluminous cements, pozzolanic cements and composite cements.

As used herein the term "dry mix" or "dry powder" means a storage stable powder containing cement, cellulose ether, any other polymeric additive, and any fillers and dry additives. No water is present in a dry mix; hence it is storage stable.

As used herein the term "DS" is the mean number of alkyl substituted OH-groups per anhydroglucose unit in a cellulose ether; the term "MS" is the mean number of hydroxyalkyl substituted OH-groups per anhydroglucose unit, as determined by the Zeisel method. The term "Zeisel method" refers to the Zeisel Cleavage procedure for determination of MS and DS, see G. Bartelmus and R. Ketterer, Fresenius Zeitschrift fuer Analytische Chemie, Vol. 286 (1977, Springer, Berlin, DE), pages 161 to 190.

As used herein, the term "lubricity" refers to the slope of a yield curve, expressed as an angle of the linearized yield locus plot measured by shear testing in accordance with ASTM D6773-16 (Standard Test Method for Bulk Solids Using Schulze Ring Shear Tester, 2016) using an automated shear tester controlled by the software RSTCONTROL 95 for MS Windows (Dietmar Schulze, Wolfenbüttel, DE), with 50,000 Pa as the given pre-shear stress. Lubricity measures the ability of particles to move against one another under shear and a lower relative normal force and a lower slope is better. In other words, a lower "internal friction" angle means higher lubricity, as internal friction is the ratio of the maximum internal shear force that resists movement between the particles of a material to a normal force (compaction) between the particles, or the resistance of the particles to moving against each other under compaction and shear.

As used herein, the term "overnight" means a period of from 10 to 14 hours.

As used herein, the term "paste" refers to mixtures comprised of a hydraulic cement and water; the paste excludes the aggregates.

As used herein, unless otherwise indicated, the phrase "polymer" includes both homopolymers and copolymers from two or more than two differing monomers, as well as segmented and block copolymers.

As used herein, the term "sieve particle size" of a material refers to a particle size as determined by sieving the material through successively smaller size mesh sieves until at least 10 wt. % of the material is retained on a given sieve and recording the size of the sieve that is one sieve size larger than the first sieve which retains at least 10 wt. % of the material.

As used herein the term "sieve particle size of total coarse aggregate" for a mixture of coarse aggregates means the weighted average of the sieve particle sizes of all coarse aggregates in the mixture. For example, the sieve particle size of a 50:50 w/w mix of a 1 mm sieve particle size coarse aggregate and a 10 mm sieve particle size coarse aggregate is (1 mm×0.5)+(10 mm×0.5) or 5.5 mm.

As used herein, the term "slump" refers to the lateral or downward flow of a standing sample of a wet cement composition over a given time period that can be measured in several ways, for example, as determined in accordance with ASTM C143 (2010).

As used herein, the term "storage stable" means that, for a given powder additive composition, the powder will not block and, for a given aqueous composition, the liquid composition will not become cloudy, separate or precipitate after 5 days, or, preferably, 10 days when allowed to stand on a shelf under room temperature conditions and standard pressure.

As used herein, the phrase "total solids", "solids" or "as solids" refers to total amounts of any or all of the non-volatile ingredients or materials present in a given composition, including synthetic polymers, monomers, natural polymers, acids, defoamers, hydraulic cement, fillers, inorganic materials, and other non-volatile materials and additives, such as initiators. Water, ammonia and volatile solvents are not considered solids.

As used herein, the term "viscosity modifying additive" means any thickener, rheology modifier or water activated polymer which increases the viscosity of an aqueous composition.

As used herein, the term "water saturation" refers to the result given by the equation Water Saturation=$(V_w+V_c)/V_v$, wherein $V_w$ is the volume of water in the wet cement composition, $V_c$ is the volume of cement $V_c$=mc/ρc, where mc is the mass of cement in the wet cement composition and pc is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mix well and pouring all of them into a container and calculating "void volume" $V_v=V-\Sigma(m_i/\rho_i)$. The void volume also is referred to as voidage or inter-particle porosity $\epsilon=[V-\Sigma(m_i/\rho_i)]/V$ and is the converse of the "packing fraction", which is given by $1-\epsilon$. As used herein, unless otherwise indicated, the term "wt. %" means weight percent based on the indicated denominator.

In accordance with the present invention, the lubricity, as improved by the (c) cellulose ether having one or more polyether groups of the present invention in the granular wet cement compositions, is insensitive to aggregate material particle size, sphericity, and roughness, and has reduced sensitivity to water loading. Thus, the granular wet cement compositions of the present invention exhibit reduced sensitivity to aggregate material particle size, sphericity, and roughness, and to water loading. This is surprising as, when compared to conventional concrete, RCC has a higher volume of aggregate, and a lower level of cement and water than conventional concrete. While such formulation differences result in a zero slump or nearly zero slump pavement, on the other hand, the high aggregate and low water content in the formulation also causes RCC to be very resistant to compaction, making the product rougher relative to traditional concrete pavements. Known viscosity modifying additives (VMAs, such as polyvinyl alcohol) that were developed for concrete and used in RCC today fail to lower yield strength (the force needed to cause the mix to yield or compact) and improve lubricity. Rather, using known commercially available VMAs to attain the optimized viscosity to avoid consolidation would require unrealistically high use levels of the VMA in the RCC wet cement compositions.

Further, the lubricity and strength of products from roller compacting cementitious compositions can be further improved by combining (c) one or more cellulose ethers having one or more polyether groups with (d) one or more superplasticizers. Adding (d) one or more superplasticizers, including polycarboxylate ether, lignosulfonate, and naphthalene sulfonate containing plasticizers can further improve the yield strength and viscosity of the RCC concrete and wet cement compositions for making them. Use of too much superplasticizer may detrimentally effect yield strength when combined with a cellulose ether having one or more polyether groups, while too little does not change the strength or lubricity of concrete made from the wet cement compositions containing them. Therefore, in accordance with the present invention, a combination of generally less than 1 wt. % of the (d) one or more superplasticizers with the (c) one or more cellulose ethers having one or more polyether groups in a total amount of 2 wt. % or less, based on the total weight of the granular wet cement compositions, can yield the best results for RCC pavement compaction and strength.

In accordance with the present invention, dry mix compositions and granular wet cementitious formulations include (c) one or more cellulose ethers having one or more polyether groups, granular materials, (a) hydraulic binders or cements, and optionally other chemical admixtures. Granular wet cement compositions comprise dry mix compositions mixed with water in the amount of from 5 to 13.6 wt. %, or, preferably, from greater than 5 to 11 wt. %, based on the total weight of the dry mix composition, and optionally admixtures supplementary cementitious materials (SCMs). As the particle size of the (b) graded aggregate and, especially, the i) coarse aggregate increase, water demand decreases. So, for example, where the (b)i) coarse aggregate has a sieve particle size of 5 mm or larger, or 6 mm or larger, suitable amounts of water may range from 5 to 8 wt. %, based on the total weight of the dry mix composition.

The (c) one or more cellulose ethers having polyether one or more groups in accordance with the present invention may comprise a cellulose ether having polyether sidechains and/or crosslinking groups. The one or more cellulose ethers may comprise a powder as part of a dry mix composition, or they may comprise part of a solution or dispersion in water as part of the second or wet component of a two-component composition wherein the first component comprises the dry mix composition (without the cellulose ether). At least one of the (c) one or more cellulose ethers having one or more polyether groups has a side chain chosen from hydroxyethyl, hydroxypropyl, methyl, and combinations thereof, or, preferably, hydroxyethyl and methyl. Accordingly, the most preferred (c) cellulose ether in accordance with the present invention comprises hydroxyethyl methyl cellulose and one or more polyether groups.

The (c) one or more cellulose ethers having polyether groups may comprise a polyether group chosen from a polyoxyalkylene, such as a polyoxyethylene, a polyoxypropylene and combinations thereof. Further, each polyether group in the cellulose ether may be a polyoxyalkylene which may have from 4 to 50 or, preferably, from 5 to 30, or, more preferably, from 6 to 25 oxyalkylene groups.

Suitable cellulose ethers for use as the (c) one or more cellulose ethers having one or more polyether groups of the present invention may include, for example, any of a polyether group containing hydroxyalkyl cellulose, any polyether group containing alkyl cellulose, a mixture of such cellulose ethers, or a combination of such cellulose ethers. Examples of suitable cellulose ethers for use in the present invention include any of the following, so long as they also have one or more polyether groups:

Methylcellulose (MC), ethyl cellulose, propyl cellulose, butyl cellulose, hydroxyethyl methylcellulose (HEMC), hydroxypropyl methylcellulose (HPMC), hydroxyethyl cellulose ("NEC"), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). Preferably, the (c) one or more cellulose ethers having polyether groups may comprise mixed cellulose ethers that, in addition to the one or more polyether groups, contains hydroxyalkyl groups and alkyl ether groups, such as those chosen from alkyl hydroxyethyl celluloses, e.g. hydroxyalkyl methylcelluloses like hydroxyalkyl methylcelluloses, for example, hydroxyethyl methylcellulose (HEMC), hydroxypropyl methylcellulose (HPMC), methyl hydroxyethyl hydroxypropylcellulose (MHEHPC), and ethylhydroxyethyl cellulose (EHEC), or, more preferably, those chosen from hydroxyethyl methylcellulose (HEMC), hydroxypropyl methylcellulose (HPMC), methyl hydroxyethyl hydroxypropylcellulose (MHEHPC), and ethylhydroxyethyl cellulose (EHEC).

In any of the (c) cellulose ethers having one or more polyether groups in accordance with the present invention, the degree of alkyl substitution is described in cellulose ether chemistry by the term "DS". The DS is the mean number of substituted OH groups per anhydroglucose unit. The degree of methyl substitution may be reported, for example, as DS (methyl) or DS (M). The degree of hydroxy alkyl substitution is described by the term "MS". The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Fresenius *Zeitschrift fuer Analytische Chemie* 286 (1977), 161-190).

Suitable cellulose ethers in accordance with the present invention can be formed by modifying or crosslinking a cellulose or a cellulose ether to include one or more polyether groups. To form a (c) cellulose ether having one or more polyether groups, cellulose can be modified, in any order, including by oxyalkylation with polyether containing modifiers, crosslinking with polyether containing crosslinkers, alkylation, and/or hydroxyalkylation in a manner known in the art, such as is disclosed in U.S. Pat. No. 10,150,704 or WIPO Publication WO 2020/223040 A1, each to Hild et al. For example, the crosslinking or polyether addition reaction may generally be conducted in the process of making a cellulose ether in a reactor in which the cellulose ether itself is made in the presence of caustic or alkali. The process may comprise stepwise addition of reactants to form alkyl ether or hydroxyalkyl ether groups and polyether groups on cellulose. Crosslinking or polyether modification of the cellulose or cellulose ethers may precede one or more addition of alkyl halide, e.g. methyl chloride, in the presence of alkali to form alkyl ethers of the cellulose. The cellulose may preferably be alkalized or activated with alkali before any modification to form cellulose ether or cellulose having polyether groups.

Known oxyalkylation or polyether containing crosslinkers may include polyether group containing modifiers having one or more or crosslinking agents having two or more, preferably, two crosslinking groups chosen from halogen groups, glycidyl groups, epoxy groups, and ethylenically unsaturated groups, e.g. vinyl groups, that form ether bonds with the cellulose ether in modifying or crosslinking the cellulose ether, for example, chloro or 1,2-dichloro (poly)alkoxy ethers, e.g. dichloropolyoxyethylene; glycidyl or diglycidyl polyalkoxyethers, e.g. diglycidyl polyoxypropylene; glycidyl(poly)oxyalkyl methacrylate; diglycidyl phosphonates; or vinyl or divinyl polyoxyalkylenes containing a sulphone group. Preferably, the modifier is a glycidyl or diglycidyl polyalkoxyether wherein the polyalkoxyether containing from 4 to 50, or from 5 to 30 or from 6 to 25 oxyalkylene groups, or, more preferably, containing oxyethylene or oxypropylene groups.

Suitable amounts of polyether modifying or crosslinking agent may range from 0.0001 to 0.05 eq, or, preferably, from 0.0005 to 0.01 eq, or, more preferably, from 0.001 to 0.005 eq, where the unit "eq" represents the molar ratio of moles of the respective modifying or crosslinking agent relative to the number of moles of anhydroglucose units (AGU) in the cellulose or cellulose ether.

Exemplary of the commercial crosslinking agents useful in the present invention, for example, crosslinking agents based on diglycidyl ether chemistry, include EPILOX™ P13-42 and EPILOX™ M 985 (Leuna-Harze GmbH). EPILOX™ M 985 poly(propyleneglycol) diglycidylether crosslinking agent is a linear poly (propyleneglycol) diglycidylether made from polypropylene glycol (PPG).

In accordance with the present invention, the (a) one or more cements or hydraulic cements refers to any hydraulic cement that sets and hardens in the presence of water. Suitable non-limiting examples of hydraulic cements include Portland cement, hydraulic hydrated lime, aluminate cements, such as calcium aluminate cement, calcium sulfoaluminate cement, calcium sulfate hemi-hydrate cement; pozzolans, which are siliceous or aluminosiliceous material with slaked lime that in finely divided form in the presence of water, chemically react with the calcium hydroxide released by the hydration of Portland cement to form materials with cementitious properties, such as diatomaceous earth, opaline cherts, clays, shales, fly ash, silica fume, volcanic tuffs and pumicites, for example, volcanic ash mixed with slaked lime; refractory cements, such as ground granulated blast furnace slag; magnesia cements, such as magnesium phosphate cement, magnesium potassium phosphate cement, and mixtures thereof. Portland cement, as used in the trade, means a hydraulic cement produced by pulverizing and calcining together a clinker, comprising of hydraulic calcium silicates, calcium aluminates, and calcium ferroaluminates, with one or more of the forms of calcium sulfate in an intergrind addition. Portland cements according to ASTM C150 are classified as types I, II, III, IV, or V. Suitable (a) hydraulic cements may be chosen from, for example, an ordinary Portland cement, an aluminate cement, a pozzolan, or their mixtures, or, preferably, an ordinary Portland cement, an aluminate cement, or a mixture thereof.

Suitable (b) graded aggregate materials include but are not limited to sand, limestone, gravel, granite, and clay and comprise a graded aggregate of i) at least one coarse aggregate and ii) at least one fine aggregate. Smaller ii) fine aggregate particles mixed with i) larger coarse aggregate particles, such as compositions with more than one particle size distribution, reduce void volume and thereby reduce cement demand, and enable improved packing and thus higher strength with less water added at a constant water-to-cement ratio. Suitable ii) fine aggregates are materials that have a sieve particle size of, for example, less than 300 μm, such as limestone, finely divided silica, talc, fillers, or pigments. Suitable i) coarse aggregates have a sieve particle size of 300 μm or larger, and may include, for example, silica, quartz, crushed round marble, glass spheres, granite, coarse limestone, calcite, feldspar, alluvial sands, or any other durable aggregate natural or manufactured sand, and mixtures thereof.

Admixtures are aqueous and may include but are not limited to plasticizers, retarders, accelerators, defoamers, (d) superplasticizers and viscosity modifying additives. Admixtures comprise one or more additives. The compositions of the present invention can contain, in addition to the cement, graded aggregate and the cellulose ether having one or more polyether groups, conventional additives in wet or dry form, such as, for example, cement setting accelerators and retarders, air entrainment agents or defoamers, shrinking agents and wetting agents; surfactants, particularly nonionic surfactants; mineral oil dust suppressing agents; biocides;

plasticizers; organosilanes; anti-foaming agents such as poly(dimethylpolysiloxanes) (PDMS) and emulsified PDMS, silicone oils and ethoxylated nonionics; and coupling agents such as, epoxy silanes, vinyl silanes and hydrophobic silanes.

The present invention discloses and relates to the following clauses:

CLAUSE 1. A granular wet cement composition from a dry mix composition and water or a wet component comprising:

as the dry mix composition:

(a) hydraulic cement, for example, pozzolans, ordinary Portland cement, aluminate cement, fly ash, and their mixtures, in the amount from 10 to 23 wt. % or, preferably, from 12 to 20 wt. %, based on the total weight of the dry mix composition, (b) graded aggregate in the amount from 76 to 89.99 wt. % or, preferably, in the amount from 79.7 to 87.95 wt. %, based on the total weight of the dry mix composition comprising i) one or more coarse aggregates having a sieve particle size of from 300 μm to 20 mm, for example, sand, limestone, gravel, granite, or clay, or, preferably, sand, or, more preferably, a combination of i)A) a first coarse aggregate and i)B) a second coarse aggregate wherein the first coarse aggregate has a sieve particle size of from 300 μm to 3000 μm and the second coarse aggregate has a sieve particle size of from 2000 μm to 20 mm, or from 3000 μm to 20 mm, or up to 18 mm, wherein the ratio of the sieve particle size of the i)B) second coarse aggregate to that of the i)A) first coarse aggregate ranges from 15:1 to 1.5:1, or, preferably, from 10:1 to 2:1, and ii) one or more fine aggregates, preferably, limestone, having a sieve particle size of from 40 μm to less than 300 μm or, preferably, from 70 μm to less than 300 μm;

all wt. % s in the dry mix composition add to 100%; and, water or a wet component containing water in the amount of from 5 to 13.6 wt. %, or, preferably, from greater than 5 to 11 wt. %, based on the total weight of the dry mix composition taking the water as separate, wherein granular wet cement composition further comprises:

as part of the dry mix composition or as part of the wet component, or as part of both as dry mix composition and a wet component:

(c) one or more cellulose ethers having one or more polyether groups, such as poly(oxyalkylene) groups, preferably, poly(oxyethylene) groups, as sidechains, crosslinks, or as sidechains and crosslinks, in the amount of from 0.01 to 1.0 wt. % or, preferably, from 0.05 to 0.3 wt. %, wherein at least one of the one or more cellulose ethers having one or more polyether groups has an aqueous solution viscosity at 1 wt. % cellulose ether solids, at 20° C., and a 2.55 $s^{-1}$ shear rate ranging from 10,000 to 100,000 mPa·s, or, preferably, 11,000 to 16,000 mPa·s, as determined using a controlled rate rotational rheometer (preferably, a Haake Rotovisko™ RV 100 rheometer, Thermo Fisher Scientific, Karlsruhe, DE), with the aqueous solution being made drying a powder of the cellulose ether overnight in a 70° C. vacuum oven, dispersing it into hot water at 70° C., and allowing it to dissolve while cooling with stirring to room temperature and refrigerating it at 4° C. overnight.

CLAUSE 2. The granular wet cement composition as set forth in item 1, above, wherein each polyether group in the (c) one or more cellulose ethers having one or more polyether groups has, independently, from 4 to 50 or from 5 to 30, or, preferably, from 6 to 25 oxyalkylene groups.

CLAUSE 3. The granular wet cement composition as set forth in any one of items 1 or 2, above, wherein the (a) hydraulic cement is chosen from an ordinary Portland cement, an aluminate cement, a pozzolan, or their mixtures, or, preferably, an ordinary Portland cement, an aluminate cement, or their mixture CLAUSE 4. The granular wet cement composition as set forth in any one of items 1, 2 or 3, above, wherein in the (b) graded aggregate, the ratio of the sieve particle size of the total i) coarse aggregate to the sieve particle size of the ii) fine aggregate may range from 20:1 to 1.5:1 or, preferably, from 10:1 to 2:1.

CLAUSE 5. The granular wet cement composition as set forth in any one of items 1, 2, 3, or 4, above, comprising as the coarse aggregate in the (b) graded aggregate a mixture of i)A) a first coarse aggregate, such as sand or gravel, having a sieve particle size of from 300 to 3000 μm and i)B) a second coarse aggregate having a sieve particle size of from 2000 μm to 20 mm, or up to 18 mm, such as gravel or stone, wherein the ratio of the sieve particle size of the i)B) second coarse aggregate to the sieve particle size of the i)A) first coarse aggregate ranges from 15:1 to 1.5:1, or, preferably, from 10:1 to 2:1.

CLAUSE 6. The granular wet cement composition as set forth in any one of items 1, 2, 3, 4, or 5, above, further comprising (d) one or more superplasticizers.

CLAUSE 7. The granular wet cement composition as set forth in item 6, above, wherein the (d) one or more superplasticizers is chosen from a polycarboxylate ether containing, naphthalene sulfonate containing, lignosulfonate containing superplasticizers, or mixtures thereof.

CLAUSE 8. The granular wet cement composition as set forth in any one of items 6 or 7, above, wherein the total amount of the (d) one or more superplasticizers comprises from 0.1 to 0.5 wt. % of polycarboxylate ethers, from 0.2 to 5.0 wt. % or from 0.3 to 1.0 wt. % of naphthalene sulfonate or lignosulfonate containing materials, preferably from 0.1 to 0.5 wt. % of polycarboxylate ethers, all amounts based on the total weight of the dry mix composition.

CLAUSE 9. The granular wet cement composition as set forth in any one of items 1, 2, 3, 4, 5, 6, 7, or 8, above, comprising the mixture of a two-component composition of a first component and a second or wet component, wherein the first component comprises the dry mix composition and the second or wet component comprises water, and, further wherein, first component dry mix composition comprises the (c) one or more cellulose ethers having one or more polyether groups and, if used, the (d) one or more superplasticizers.

CLAUSE 10 The granular wet cement composition as set forth in any one of items 1, 2, 3, 4, 5, 6, 7, or 8, above, comprising the mixture of a two-component composition of a first component and a second or wet component, wherein the first component comprises the dry mix composition and the second or wet component comprises water, and, further wherein, the second or wet component comprises the (c) one or more cellulose ethers having one or more polyether groups and, if used, the (d) one or more superplasticizers.

CLAUSE 11. The granular wet cement compositions as set forth in any one of items 1, 2, 3, 4, 5, 6, 7, 8, 9, or 10, above, having a slump of 6 mm or less or, preferably, 4.5 mm or less, as determined in accordance with ASTM C143 (2010) using a stainless steel cone height 80 mm, top diameter 40 mm, bottom diameter 90 mm, steel rod stirrer, preferably, of 9.5 mm diameter and 266.7 mm length, by mixing the dry mix compositions in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into the stainless-steel cone which has been dampened with water via a sponge and placed on a non-absorbent surface, filling each equal layer and mixing with the stainless steel rod in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm.

CLAUSE 12. The granular wet cement compositions as set forth in any one of items 1, 2, 3, 4, 5, 6, 7, 8, 9, 10 or 11, above, wherein the compositions have a lubricity of from 22° to 37° or less, or, preferably, from 26° to 36°, determined as the angle of the slope of a yield curve of the normal stress at which the compositions yield in shear testing plotted versus the normal stress (on the abscissa), wherein the normal stress is varied from 25% to 80% of a pre-shear normal stress in accordance with ASTM D6773-16 (2016), preferably, using an automated shear tester controlled by the software RSTCONTROL 95 for MS Windows (Dietmar Schulze, Wolfenbüttel, DE), and using 50,000 Pa as the pre-shear normal stress and then reducing normal stress and measuring over a normal stress range of from 12,500 Pa to at least 40,000 Pa with a point spacing of 5 points per decade of % of pre-shear normal stress CLAUSE 13. The granular wet cement compositions as set forth in any one of items 1, 2, 3, 4, 5, 6, 7, 8, 9, 10, 11 or 12, above, wherein the compositions have a water saturation level of less than 62%, or, preferably, 59% or less as defined by the percentage of voids filled with wet cement, or cement plus water, as expressed by the following equation:

$$\text{Water saturation}=(V_w+V_c)/V_v,$$

wherein $V_w$ is the volume of water in the wet cement composition, $V_c$ is the volume of cement $V_c=m_c/\rho_c$, where $m_c$ is the mass of cement in the wet cement composition and pc is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mixing well and pouring all of them into a container and calculating void volume $V_v=V-\Sigma(m_i/\rho_i)$, further wherein, the weight ratio of the total i) coarse aggregate to the total ii) fine aggregate in the (b) graded aggregate ranges from 4:1 to 0.9:1, or, preferably, from 3:1 to 1:1; and, still further wherein, all wt. % s add to 100%.

CLAUSE 14. The granular wet cement compositions as set forth in any one of items 1, 2, 3, 4, 5, 6, 7, 8, 9, 10, 11, 12 or 13, above, wherein the compositions have a slump as determined in accordance with ASTM C143 (2010), by mixing the dry mix in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into a stainless-steel cone (height 80 mm, top diameter 40 mm and bottom diameter 90 mm) which has been dampened with water via a sponge and placed on a non-absorbent surface, filling each layer and mixing with a stainless-steel rod (preferably, of 266.7 mm length and 9.5 mm diameter) in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm, of less than 6 mm, or, preferably, less than 4.5 mm.

CLAUSE 15. A method of using the granular wet cement compositions as set forth in any one of items 1, 2, 3, 4, 5, 6, 7, 8, 9, 10, 11, 12, 13 or 14, above, comprising:

forming the granular wet cement composition by mixing water, (a) hydraulic cement and (b) graded aggregate to form a wet cement composition, adding thereto the (c) one or more cellulose ethers having one or more polyether groups, and any (d) superplasticizer(s) as a dry powder or aqueous liquor and mixing in a pump or a pug mill mixer to form the granular wet cement composition, applying the granular wet cement composition to a substrate without a mold or a form, and, then, paving or rolling the wet cement compositions to form a concrete or cement layer, such as a road or pavement.

The paving or rolling may be carried out using a steam roller without the steam or using conventional or high-density asphalt paving equipment, preferably, in the absence of added heat.

CLAUSE 16. The method as set forth in item 15, above, wherein the granular wet cement composition comprises water and a dry mix composition of:

(a) hydraulic cement, for example, pozzolans, ordinary Portland cement, aluminate cement, fly ash, and their mixtures, in the amount of from 10 to 23 wt. % or, preferably, from 12 to 20 wt. %, based on the total weight of the dry mix composition, (b) graded aggregate in the amount of from 70 to 89.95 wt. % or, preferably, in the amount of from 75 to 89.65 wt. %, based on the total weight of the dry mix composition comprising i) one or more coarse aggregates having a sieve particle size of from 300 μm to 20 mm, for example, sand, limestone, gravel, granite, or clay, or, preferably sand, or, more preferably, a combination of A) a first coarse aggregate and B) a second coarse aggregate wherein the first coarse aggregate has a sieve particle size of from 300 μm to 3000 μm and the second coarse aggregate has a sieve particle size of from 2000 μm to 20 mm wherein the ratio of the sieve particle size of the second coarse aggregate to that of the first coarse aggregate ranges from 15:1 to 1.5:1, or, preferably from 10:1 to 2:1, and ii) one or more fine aggregates, preferably limestone, having a sieve particle size of from 40 μm to less than 300 μm or, preferably, from 70 μm to less than 300 μm, (c) one or more cellulose ethers having one or more polyether groups, such as poly(oxyalkylene) groups, preferably, poly(oxyethylene) groups, in the amount of 0.01 to 1.0 wt. % or, preferably, from 0.05 to 0.3 wt. %, based on the total weight of the dry mix composition, wherein the cellulose ether having one or more polyether groups has an aqueous solution viscosity at 1 wt. % cellulose ether solids, at 20° C., and a 2.55 $s^{-1}$ shear rate ranging from 10,000 to 100,000 mPa·s, or, preferably, 11,000 to 16,000 mPa·s, as determined using a controlled rate rotational rheometer (preferably, a Haake Rotovisko™ RV 100 rheometer, Thermo Fisher Scientific, Karlsruhe, DE), with the aqueous solution being made by drying a powder of the cellulose ether overnight in a 70° C. vacuum oven, dispersing the powder into hot water at 70° C., allowing the particles to dissolve with stirring as the slurry cools to room temperature and refrigerating it overnight (4° C.) to form the aqueous solution; and, water, wherein the water is present in the amount of from 5 to 13.6 wt. %, or, preferably, from greater than 5 to 11 wt. %, based on the total weight of the dry mix composition; and, further wherein, all wt. % s in the dry mix composition add to 100% treating water as separate.

CLAUSE 17. The method as set forth in any one of items 15 or 16, above, wherein, the granular wet cement composition has a water saturation level of 62% or less, as defined by the percentage of voids filled with wet cement, which is cement plus water, as expressed by the following equation:

$$\text{Water saturation} = (V_w + V_C)/Vv,$$

wherein $V_w$ is the volume of water in the wet cement composition, $V_c$ is the volume of cement $V_c = m_c/\rho c$, where $m_c$ is the mass of cement in the wet cement composition and pc is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mixing well and pouring all of them into a container and calculating void volume $V_v = V - \Sigma(m_i/\rho_i)$.

CLAUSE 18. The method as set forth in any one of items 15, 16 or 17, above, wherein in the granular wet cement composition, the weight ratio of the i) total coarse aggregate to the ii) total fine aggregate in the (b) graded aggregate ranges from 4:1 to 0.9:1, or, preferably, from 3:1 to 1:1.

CLAUSE 19. The method as set forth in any one of items 15, 16, 17, or 18, above, wherein the granular wet cement composition comprises as the i) coarse aggregate in the (b) graded aggregate a mixture of a i)A) lower sieve particle size material or first coarse aggregate having a sieve particle size of from 300 μm to less than 3000 μm and a i)B) higher sieve particle size material or second coarse aggregate having a sieve particle size of from 3000 μm to 20 mm, or, preferably, from 1.5 to 18 mm, such as sand or gravel.

CLAUSE 20. The method as set forth in any one of items 15, 16, 17, 18, or 19, above, wherein ratio of the sieve particle size of the (b) i) total coarse aggregate to the sieve particle size of the (b) ii) fine aggregate in the granular wet cement composition ranges from 20:1 to 1.5:1 or, preferably, from 10:1 to 2:1.

CLAUSE 21. A method of using the granular wet cement compositions as set forth in any one of items 1, 2, 3, 4, 5, 6, 7, 8, 9, 10, 11, 12, 13 or 14, above, comprising:

forming a wet component of the (c) one or more cellulose ethers having one or more polyether groups and any (d) superplasticizer(s);

forming the granular wet cement composition by mixing the wet component with (a) hydraulic cement and (b) graded aggregate and mixing in a pump or a pug mill mixer to form the granular wet cement composition, applying the granular wet cement composition to a substrate without a mold or a form, and, then, paving or rolling the wet cement compositions to form a concrete or cement layer, such as a road or pavement.

CLAUSE 22. The method as set forth in any one of items 15, 16, 17, 18, 19, 20 or 21, above, comprising:

paving or rolling using a steam roller without the steam or using conventional or high-density asphalt paving equipment, preferably, in the absence of added heat.

EXAMPLES

The following examples illustrate the present invention. Unless otherwise indicated, all parts and percentages are by weight and all temperatures are in ° C. and all preparations and test procedures are carried out at ambient conditions of room temperature (23° C.) and pressure (1 atm). In the examples and Tables 1, 2, and 3 that follow, the following abbreviations were used: CE: cellulose ether; DGE: Diglycidyl Ether; EO: Ethylene Oxide; MPEG: Methoxypoly (ethylene glycol); MAA: Methacrylic acid; AA: Acrylic acid; MMA: Methyl methacrylate; PEO: Poly(ethylene oxide); VMA: Viscosity modifying additive.

The following materials were used in the Examples that follow (All components were used as received):

Silica sand: Sieve particle size of 300 μm (Fairmount Minerals 730, Fairmount Minerals LLC, Oklahoma City, OK);

Crushed limestone: $CaCO_3$, Sieve particle size 44 μm (MICRO-WHITE™ 100, Nagase Specialty Materials NA LLC, Itasca, IL);

Manufactured sand: 6 mm sieve particle size;

Portland cement: Type 1 portland cement);

Water (deionized);

Cellulose ether 1: Ultra high viscosity Hydroxyethyl methylcellulose (HEMC), (WALOCEL™ M 120-01, The Dow Chemical Co., Midland, MI (Dow), MS=0.27, DS=1.57; 1 mmol EPILOX™ M985 cross-linker per 1 mol anhydroglucose unit, degree of substitution <0.01; 1 wt. % aqueous solution viscosity measured on Haake Viskotester™ VT-550 at 2.55 1/s and 20° C. was 13200 mPa·s);

Cellulose ether 2: Hydroxyethyl methylcellulose (HEMC), WALOCEL™ MW 15000 PFV Dow, MS=0.17, DS=1.40, viscosity of 1 wt. % aqueous solution viscosity measured on Haake Viskotester™ VT-550 at 2.55 1/s and 20° C. was 972 mPa·s);

Cellulose ether 3: Hydroxyethyl methylcellulose (HEMC) (WALOCEL™ M-20678 cellulose ether, Dow, MS=0.33, DS=1.44, 1 wt. % aqueous solution viscosity measured on Haake Viskotester™ VT-550 at 2.55 1/s and 20° C. was 10700 mPa·s) The following formulation method was used in the examples that follow:

Dry Mix and Wet cement Preparation: The indicated sand, limestone, cement, cellulosic ether, and superplasticizer in all of Tables 1A, 1B, 1C, and 1D were dry mixed in a plastic bag for two minutes, and then added to the water in a mixing bowl (Hobart N50 Mixer, Hobart Corp., Troy, OH). Each formulation was mixed at a low rotation rate (136 RPM) for 15 seconds, while mixing bowl sides were scraped off and returned to the bowl bottom. The formulations were mixed at the same rotation rate again for 15 seconds. In all tests, the wet cement compositions were tested within 10 min. after preparation. All compositions totaled 800 g powder solids, where 800 g is 100% dry parts powder. Water wt. % is based on the total formulation weight, which includes powder solids and water.

TABLE 1A

Comparative Formulation 1 Without Cellulose Ether and Superplasticizer

| Material | Wt. % |
|---|---|
| Portland cement | 15.0 |
| Silica sand | 65.0 |
| Crushed limestone | 20.0 |
| Total VMA amount | 0.0 |
| Total Parts of Dry Powder | 100.0 |
| Water to powder ratio (w/w) | 0.135:1 |
| Water fraction of total sample | 11.89% |

TABLE 1B

Formulation 2 With Cellulose Ether at 54.5% Water Saturation

| Material | Wt. % |
|---|---|
| Portland Cement | 15.0 |
| Silica sand | 64.8 |
| Crushed limestone | 20.0 |
| Cellulose ether or VMA (See Tables 2 and 3) | 0.2 |
| Total Parts of Dry Powder | 100.0 |
| Water to powder ratio (w/w) | 0.135:1 |
| Water fraction of total sample | 11.89% |

TABLE 1C

Comparative Formulation 3 with 58% Water Saturation

| Material | Wt. % |
|---|---|
| Portland Cement | 15.0 |
| Silica sand | 65.0 |
| Crushed limestone | 20.0 |
| Cellulose ether or other VMA (See Tables 2 and 3) | 0 |
| Total Parts of Dry Powder | 100.0 |
| Water to powder ratio (w/w) | 0.148:1 |
| Water fraction of total sample | 12.89% |

TABLE 1D

Formulation 4 With 0.1 to 0.3% VMA and 58% Water Saturation

| Material | Wt. % |
|---|---|
| Portland Cement | 15.0 |
| Silica sand | 64.7-64.9* |
| Crushed limestone 100 | 20.0 |
| Cellulose ether or other VMA (See Tables 2 and 3) | 0.1-0.3* |
| Total Parts of Dry Powder | 100.0 |
| Water to powder ratio (w/w) | 0.148:1 |
| Water fraction of total sample | 12.89% |

*Total amounts of silica sand and VMA or CE are 65.0 wt. %.

Test Methods: The following test methods were used in the examples that follow:

Water Saturation: Defined as the percent void volume that is filled with a cement paste. A cement paste includes both the cement and water volume fractions but excludes graded aggregate. Water Saturation is given by the equation $$\text{Water Saturation} = (V_w + V_c)/Vv,$$

wherein $V_w$ is the volume of water in the wet cement composition, $V_c$ is the volume of cement $V_c=m_c/\rho_c$, where $m_c$ is the mass of cement in the wet cement composition and $\rho_c$ is the material density of the cement, and $V_v$ is the total void volume in the total mixture determined by measuring the particle density of each material other than cement and water, $\rho_i$. The mass of each material, $m_i$, other than cement and water was measured. The density of each material other than cement and water, $\rho_i$, was determined by pouring each material into a graduated container to measure its volume. The volume of water, $V_w$, was measured by pouring it into a graduated container. The mass of water, $m_W$, was recorded. Likewise, the density and mass of the cement $\rho_i$, and $m_i$, was measured. From this, "void volume" $V_v=V-\Sigma(m_i/\rho_i)$ was calculated. The void volume also is referred to as voidage or inter-particle porosity $\epsilon=[V-\Sigma(m_i/\rho_i)]/V$ and is the converse of the "packing fraction", which is given by $1-\epsilon$. To measure Water Saturation, the volume $V_w$ of the indicated amount of water the volume of dry cement, $V_c$, as well as the mass and density of the cement were measured. Cement volume was recorded as $V_c=m_c/\rho_c$, where $m_c$ is the mass of cement in the sample and $\rho_c$ is the material density of the cement. Water saturation=$(V_w+V_c)/V_V$. To measure Water Saturation in a wet cement composition, a dry mixture of sand and aggregates, not including cement and water, was prepared and the dry volume, V of the given mixture was measured by pouring each into a graduated container. Then, the indicated wet cement composition was formed and the void volume determined.

Ring Shear Testing: Shear testing was performed in accordance with ASTM D6773-16 (Standard Test Method for Bulk Solids Using Schulze Ring Shear Tester, 2016). An automated shear ring tester, controlled by the software RSTCONTROL 95 for MS Windows (Dietmar Schulze, Wolfenbüttel, DE), was used to measure parameters with 50,000 Pa as the given pre-shear stress. The indicated wet cement composition samples were loaded into an annular test cell after being slaked for 10 minutes. Each sample weight was recorded. The test cell was then placed into the ring shear tester and the ring shear testing program was initiated. Three parameters were measured to quantify properties of the wet cement compositions: Unconfined yield strength, cohesion, and internal friction angle. Unconfined yield strength or Yield Strength quantifies the strength of a bulk solid under a level of compaction or consolidation in an unconfined state (no confining side walls) and was determined as the stress level (normal) that caused the wet cement composition in an unconfined state to yield in response to shear. Internal friction angle (Lubricity), or the ability of particles in the composition to move against one another under shear, was determined as the slope of a yield curve measured by shear testing. Internal friction equals the resistance of the particles to moving against each other under compaction and shear and is the ratio of the maximum internal shear force that resists the movement of the particles to the normal force between the particles. Lubricity was determined as the slope of a yield curve measured by the ring shear tester, wherein the curve plots the maximum internal shear at which the particles resist movement (do not yield or fail) versus the normal stress at which the composition is exposed to normal compaction. Lower internal friction means higher lubricity. Cohesion determines the strength of the wet cement compositions when external forces are not applied and quantifies the attractive forces between particles.

Rheology of Wet Cement Composition: Rheological data was measured at 20.0° C. with a stress-controlled rotational rheometer (AR-G2, TA Instruments, New Castle, DE) equipped with a Peltier temperature controller and using RHEOLOGY ADVANTAGE™ data acquisition software (TA Instruments, v5.5.24). Materials were sheared via rotation of a four-vaned stainless-steel rotor within a stainless-steel cup having an inside radius of 15.00 mm. The vane had an outside radius of 14.00 mm. The cup was filled to 42.00 mm immersed height. Approximate sample volume was 28.72 mL. Expressions used to translate transducer data into rheology were associated with DIN concentric-cylinder fixtures, so the rheology data were labelled as apparent rheology. Wet cement compositions were studied immediately after their preparation in a Hobart mixer. First, the recovery of the composition from flow in the Hobart mixer was monitored for 15 minutes with a time-resolved small-amplitude oscillatory shear flow (angular oscillation frequency of 1 rad/s, stress amplitude in the linear viscoelastic regime). The yield stress ($\sigma_Y$) of the recovered unconfined paste was determined with a stress amplitude sweep (1 to 5000 Pa, 25 points/decade). The yield stress was identified as the stress amplitude associated with the inflection point of the dependence of the magnitude of the complex shear modulus magnitude $|G^*|$ on the stress amplitude $\sigma_0$. The inflection point was determined quantitatively with a nonlinear fit of data on semi-log axes with a sigmoidal function. Three replicate studies were performed using a fresh wet cement composition aliquot for each replicate and the results were averaged.

Slump of wet cement composition: Slump was measured in accordance with ASTM C143 and determined by mixing dry ingredients in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into a stainless steel cone (height 80 mm, top diameter 40 mm and bottom diameter 90 mm) which has been dampened with water via a spray bottle and placed on a non-absorbent surface, filling each layer and mixing with a stainless steel rod (266.7 mm long, 9.5 mm diameter) in a circular motion, positioning the rod parallel to the sides of the cone and working to a vertical position to finish in the center, finishing the surface of the wet cement composition flush with the top of the cone, pulling the cone up and off of the wet cement composition and recording the slump by measuring the total height of the cone and reporting the difference in the measured height and the initial 80 mm height.

TABLE 2

Cellulose Ether Ring Shear Testing of Wet Cement Compositions at 54.5% Water Saturation

| Example | Formulation | Cellulose Ether (CE) | CE Level (wt. %) | Viscosity (Pa · s)[1] | Yield Strength (kPa) | Lubricity (°) |
|---|---|---|---|---|---|---|
| 1-1* | 1* | None | 0 | 0.001 | 34 | 39 |
| 1-2* | 2 | 2 | 0.2 | 4 | 55 | 36.4 |
| 1-3* | 2 | 3 | 0.2 | 22 | 57 | 33.4 |
| 1-4 | 2 | 1 | 0.2 | 33 | 57 | 35.7 |

*Denotes Comparative Example;
[1]At 20.0° C. using a stress-controlled rotational rheometer (AR-G2, TA Instruments).

As shown in Table 2, above, the inventive Example 1-4 exhibited the highest yield strength of 45 kPa or more at an acceptably low angle of lubricity of less than 36 degrees. The inventive composition thus is readily compacted without consolidating and provides sufficient yield strength to resist changing shape in the absence of compactive forces.

TABLE 3

Cellulose Ether Ring Shear Testing of Wet Cement Compositions At 58% Water Saturation

| Example | Formulation | Cellulose Ether (CE) | CE Level (wt. %) | Viscosity (Pa · s)[1] | Yield Strength (kPa) | Lubricity (°) |
|---|---|---|---|---|---|---|
| 2-1* | 3 | None | 0% | 0.001 | 29 | 38.2 |
| 2-2* | 4 | 2 | 0.2% | 2.9 | 41 | 22.3 |

TABLE 3-continued

Cellulose Ether Ring Shear Testing of Wet Cement Compositions At 58% Water Saturation

| Example | Formulation | Cellulose Ether (CE) | CE Level (wt. %) | Viscosity (Pa · s)[1] | Yield Strength (kPa) | Lubricity (°) |
|---|---|---|---|---|---|---|
| 2-3* | 4 | 2 | 0.3% | 14.9 | 33 | 17.5 |
| 2-4* | 4 | 3 | 0.2% | 15 | 30 | 14.8 |
| 2-5* | 4 | 3 | 0.25% | 37 | 44 | 21.0 |
| 2-6 | 4 | 1 | 0.1% | 14.4 | 60 | 36.0 |
| 2-7 | 4 | 1 | 0.2% | 23 | 59 | 29.3 |

*Denotes Comparative Example;
[1]At 20.0° C. using a stress-controlled rotational rheometer (AR-G2, TA Instruments).

As shown in Table 3, above, the inventive wet cement compositions in Examples 2-6 and 2-7 with cellulose ethers having one or more polyether groups all exhibited excellent yield strength and compacted without consolidation; and, as evidenced by their Lubricity, they were compacted without displacement. Because of the presence of the cellulose ether having one or more polyether groups, and, thereby, a high viscosity in the water phase, the inventive examples performed well even at a high level of water saturation. Relatively high molecular weight cellulose ethers without polyether groups, either as sidechains or crosslinks in Comparative Examples 2-4 and 2-5 failed to give adequate yield strength at a 58% water saturation, yet consolidated rather than compacting; and these examples had too high a lubricity. Lower viscosity cellulose ethers without polyether groups, either as sidechains or crosslinks in Comparative Examples 2-2 and 2-3 failed to give adequate yield strength even at higher cellulose ether loading levels and consolidated rather than compacting; and these examples had too high a lubricity, which apparently was made even more pronounced in Comparative Example 2-3 at a higher cellulose ether loading of 0.3%.

TABLE 4

Slump of Indicated Wet Cement Formulations

| Example | Formulation | Slump (mm) | Saturation % |
|---|---|---|---|
| 3-1* | 3 (Example 2-1) | 0 | 58% |
| 3-2 | 4 (Example 2-7) | 0 | 58% |

*Denotes Comparative Example.

As shown in Table 4, above, the slump, which is directly correlated to the yield stress of the mixture, is a sensitive function of the water saturation. At 58% water saturation, each of Examples 3-1 and 3-2 had zero slump, indicating that the granular wet mix composition can be compacted or rolled rather than poured. Because of the low hydraulic cement concentration, the amount of water in the composition remains low.

We claim:

1. A dry mix composition comprising:

(a) hydraulic cement in the amount of from 10 to 23 wt. %, based on the total weight of the dry mix composition, (b) graded aggregate in the amount of from 70 to 89.95 wt. %, based on the total weight of the dry mix composition, comprising i) one or more coarse aggregates having a sieve particle size of from 300 μm to 20 mm, and ii) one or more fine aggregates having a sieve particle size of from 70 μm to less than 300 μm, wherein a weight ratio of the i) total coarse aggregates to the ii) total fine aggregates in the graded aggregate ranges from 4:1 to 0.9:1, (c) from 0.01 to 1.0 wt. %, based on the total weight of the dry mix composition, of a powder of one or more cellulose ethers having one or more polyether groups and having an aqueous solution viscosity at 1 wt. % cellulose ether solids, at 20° C., and a 2.55 $s^{-1}$ shear rate ranging from 10,000 to 100,000 mPa·s, as determined using a controlled rate rotational rheometer, wherein the aqueous solution was made by drying the cellulose ether powder overnight in a 70° C. vacuum oven, dispersing the powder into hot water at 70° C., allowing it to dissolve with stirring as it cools to room temperature and refrigerating it overnight at 4° C. to form the aqueous solution, wherein, all wt. % s add to 100%.

2. The dry mix composition as claimed in claim 1, wherein the (a) hydraulic cement is chosen from an ordinary Portland cement, an aluminate cement, a pozzolan, or their mixtures.

3. The dry mix composition as claimed in claim 1, wherein in the (b) graded aggregate, a ratio of the sieve particle size of the total i) coarse aggregate to the sieve particle size of the ii) fine aggregate ranges from 10:1 to 2:1.

4. The dry mix composition as claimed in claim 3, wherein the (b) graded aggregate comprises as the i) coarse aggregate a mixture of a i) A) first coarse aggregate having a sieve particle size of from 300 μm to 2000 μm and a i) B) second coarse aggregate having a sieve particle size of from 2000 μm to 20 mm, further wherein the ratio of the sieve particle size of the i) B) second coarse aggregate to the sieve particle size of the i) A) first coarse aggregate ranges from 15:1 to 1.5:1.

5. The dry mix composition as claimed in claim 1, wherein each polyether group in at least one of the cellulose ethers in the (c) powder of the one or more cellulose ethers having one or more polyether groups, independently, has from 4 to 50 ether or oxyalkylene groups.

6. The dry mix composition as claimed in claim 1, wherein at least one of the cellulose ethers in the (c) powder of the one or more cellulose ethers having one or more polyether groups has a polyether degree of substitution of from 0.0005 to 0.01 eq, as determined by a number of molar equivalents of polyether containing reactants per mole of anhydroglucose units (AGU) in the cellulose or cellulose ether used to make the cellulose ether having one or more polyether groups.

7. The dry mix composition as claimed in claim 1, wherein at least one of the cellulose ethers in the (c) powder of the one or more cellulose ethers having one or more polyether groups further has a side chain chosen from hydroxyethyl, hydroxypropyl, methyl, and combinations thereof.

8. The dry mix composition as claimed in claim 7, wherein at least one of the cellulose ethers in the (c) powder of the one or more cellulose ethers having one or more polyether groups is a hydroxyethyl methyl cellulose ether having a hydroxyethyl degree of substitution (MS) ranging from 0 and 0.4, and a methoxyl degree of substitution (DS) of from 1.2 to 1.8, or is a hydroxyethyl cellulose having a hydroxyethyl degree of substitution (MS) of from 1.4 to 2.4.

9. The dry mix composition as claimed in claim 1, further comprising (d) one or more superplasticizers.

10. The dry mix composition as claimed in claim 1, wherein the dry mix composition provides when further comprising water in the amount of from 5 to 13.6 wt. %, based on the total weight of the dry mix composition, a granular wet mix composition which has a slump of 6 mm or less, as determined in accordance with ASTM C143 (2010) using a stainless steel cone height 80 mm, top diameter 40 mm, bottom diameter 90 mm, and a steel rod stirrer 9.5 mm diameter, 266.7 mm length by mixing the dry mix compositions in a plastic bag, adding the dry mix composition to the water in a Hobart mixing bowl to form a mixture, mixing twice on speed 1 for 15 s and stopping after mixing each time to scrape the mixing bowl, slaking the mixture for 10 minutes and pouring the mixture in three equal layers into the stainless-steel cone which has been dampened with water via a sponge and placed on a non-absorbent surface, filling each of the three layers and mixing with the stainless steel rod in a circular motion, positioning the rod parallel to the sides of the cone and working to a vertical position to finish in a center, finishing a surface of the wet cement composition flush with a top of the cone, pulling the cone up and off of the wet cement composition and recording the slump within 30 seconds by measuring the total height of the cone and reporting a difference in the measured height and 80 mm.

* * * * *